United States Patent
Haren

(10) Patent No.: US 6,662,249 B2
(45) Date of Patent: Dec. 9, 2003

(54) SYSTEM AND METHOD FOR CONVERSION OF ADDRESSES OF VARYING BIT LENGTHS BETWEEN A BUS AND A DEVICE CONTROLLER

(75) Inventor: Ken C. Haren, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 09/817,290

(22) Filed: Mar. 27, 2001

(65) Prior Publication Data

US 2002/0174281 A1 Nov. 21, 2002

(51) Int. Cl.$^7$ ............................................... G06F 12/13
(52) U.S. Cl. ........................ 710/65; 710/107; 711/100; 712/246
(58) Field of Search ........................... 710/1, 5, 20, 29, 710/36, 65, 66, 68–71, 107; 712/225, 220; 709/246, 247; 711/100

(56) References Cited

U.S. PATENT DOCUMENTS

| | | | |
|---|---|---|---|
| 5,301,219 A | 4/1994 | Cronyn | 377/44 |
| 5,913,050 A | 6/1999 | Boggs et al. | 711/216 |
| 5,940,809 A | 8/1999 | Musmanno et al. | 70/35 |
| 5,960,456 A | 9/1999 | Herbst | 711/141 |
| 6,341,347 B1 | 1/2002 | Joy et al. | 712/228 |

*Primary Examiner*—Jeffrey Gaffin
*Assistant Examiner*—Rijue Mai
(74) *Attorney, Agent, or Firm*—Kenyon & Kenyon

(57) ABSTRACT

A device, method and computer program for communicating between a device controller and an industry standard bus. This device method and computer program requires no modification of the core logic of the device driver even though the data and commands transmitted between the device controller and the bus require a different format and different length commands. This device utilizes a convert and store logic unit to convert commands from the core unit to a reduced bit format suitable for the industry standard bus.

19 Claims, 3 Drawing Sheets

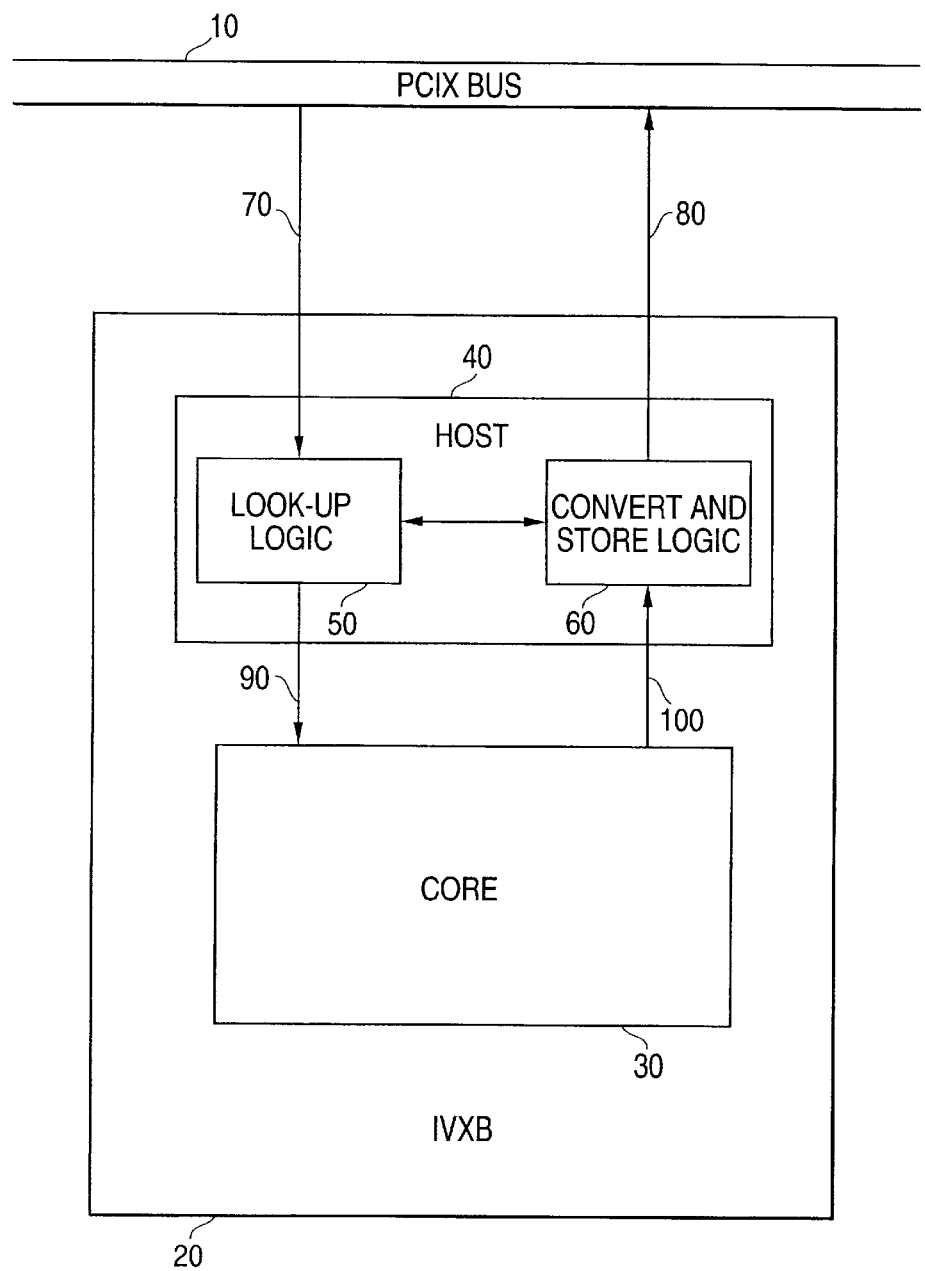

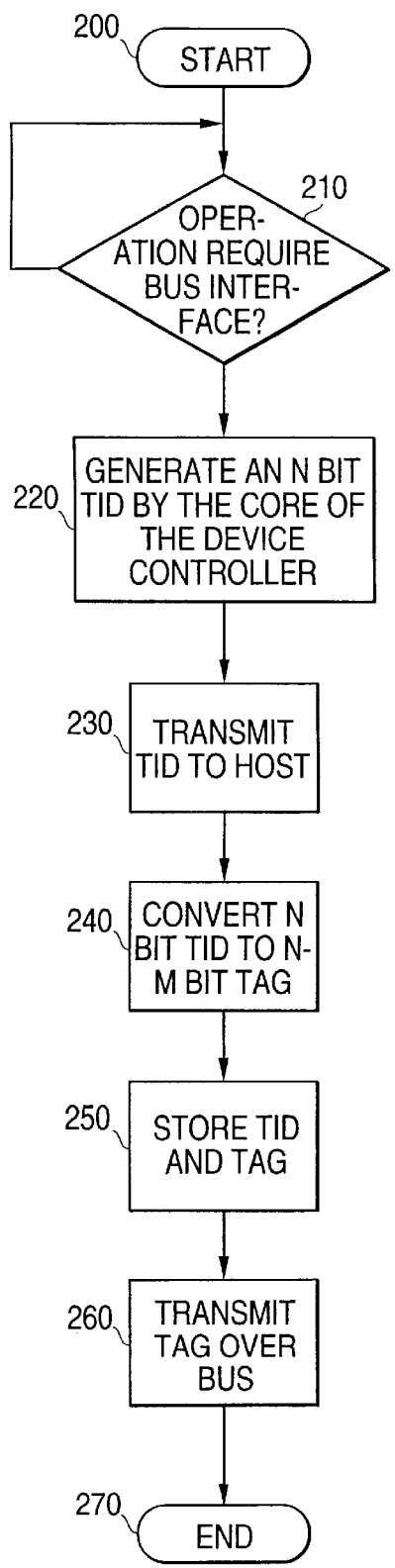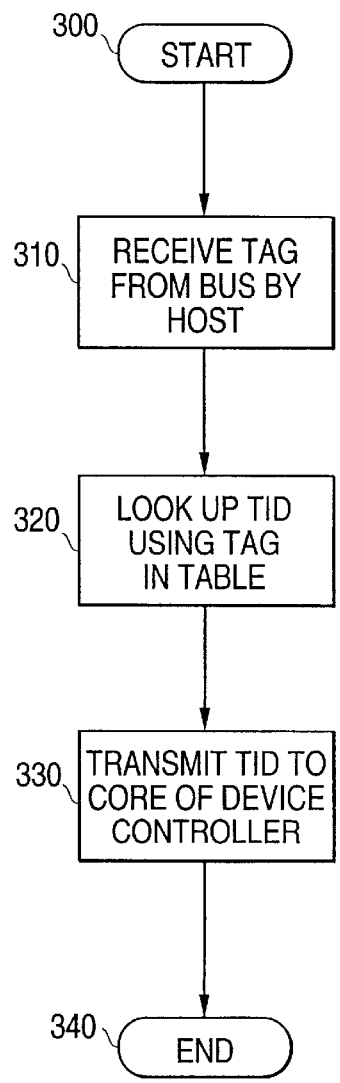

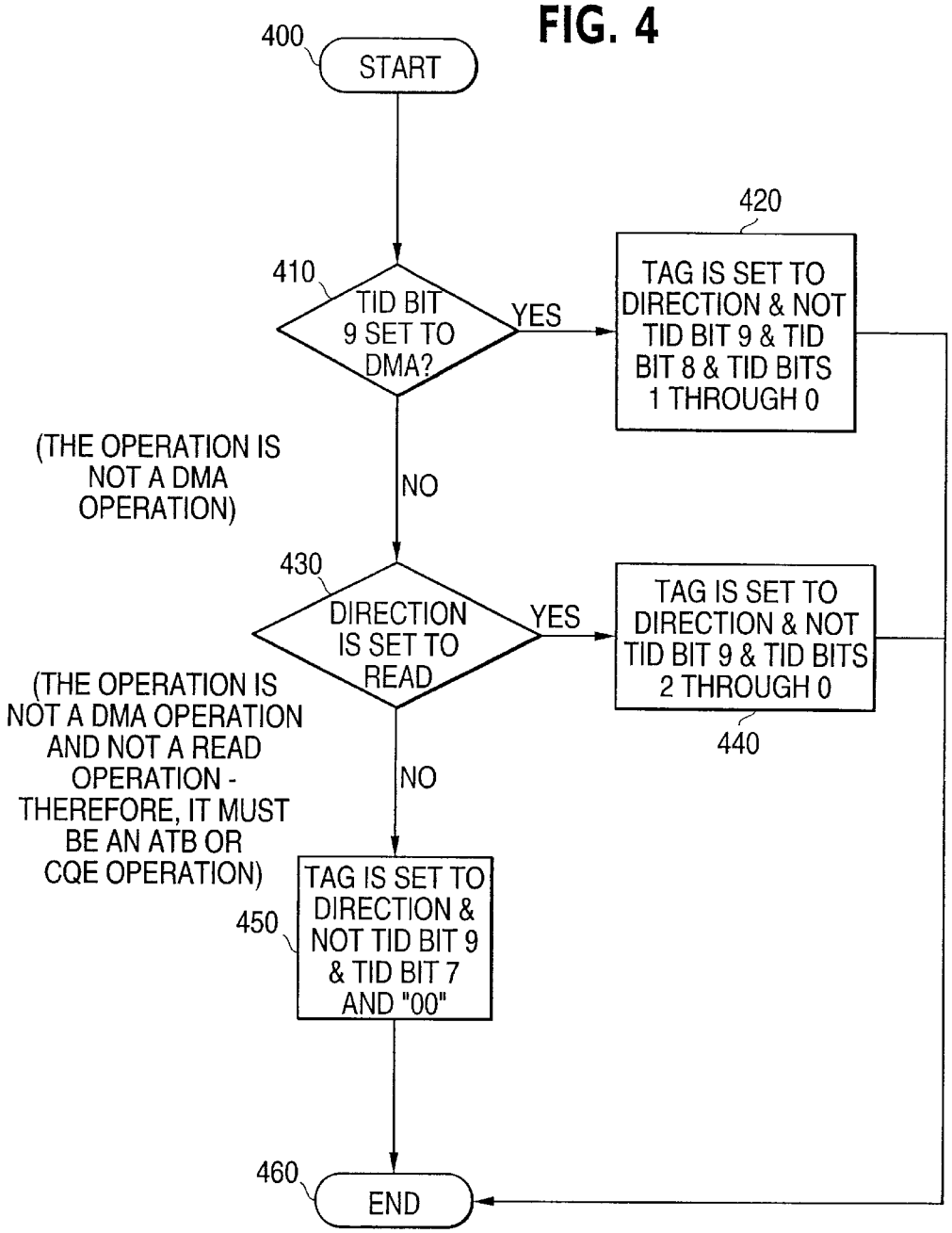

SYSTEM AND METHOD FOR CONVERSION OF ADDRESSES OF VARYING BIT LENGTHS BETWEEN A BUS AND A DEVICE CONTROLLER

FIELD

The invention relates to a system and method for conversion of addresses of varying bit lengths between a bus and a device controller. More particularly, the present invention relates to a system and method that uses a simple method to convert address data from one format and length to another in order to communicate between an industry standard bus and existing proprietary logic for device controllers.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. Very often the foregoing buses were proprietary to a particular manufacture and thus made it difficult for peripheral equipment from one manufacture to be utilized by another manufacture. Therefore, to overcome this lack of compatibility several industry standard buses were developed such as peripheral component interface (PCI) bus, peripheral component interface extended (PCIX) bus, to universal serial bus (USB) bus, amongst others. These industry standard buses enable different devices, such as, but not limited to, disk drives, printers and other devices and controllers to be easily integrated into a single computer system.

However, there are at least two problems encountered in converting from controllers designed to communicate with the proprietary buses to the use of the foregoing standard buses. First, is that the older controllers have to be redesigned to interface to the standard buses. Second, in many cases the manner in which addressing and commands are handled by these industry standard buses is inadequate for the particular controller. For example, an industry standard bus such as PCIX requires the use of a tag which is five bits long and is utilized primarily for addressing purposes. However, in many controllers a five bit tag is grossly inadequate. This may be for several reasons including the amount of address space that has to be handled by the controller. Further, in many cases the tag is utilized internally by the controller to indicate what operations are to be performed on specific pieces of data. Still further, even when the controller and the bus both require similar information in the tag each may specify a different order for that information. Therefore, manufacturers are faced with the problem of either retaining the proprietary bus as well have incorporating the industry standard buses on the baseboard. This approach utilizes a significant amount of space on a computer baseboard as well as complicating communications on that baseboard.

Therefore, what is required is a system and method in which the proprietary bus may be eliminated from the computer baseboard while at the same time the core logic utilized by the controller that interfaces to to the proprietary bus may be retained. This system and method should enable the simple conversion of a tag to and from the format required by the industry standard bus to that required by core logic of a particular controller.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 1 is an example hardware block diagram of an example embodiment of the present invention;

FIG. 2 is a flowchart of a transmission module used to transmit information to a bus from a device controller in an example embodiment of the present invention;

FIG. 3 is a flowchart of a reception module used to receive information from a bus by a device controller in an example embodiment of the present invention; and FIG. 4 is a flowchart of the logic executed by an alternate embodiment of the present invention in which the bus is a peripheral component interface extended (PCIX) bus and the peripheral controller is an InfiniBand virtual expansion bus (IVXB).

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGs. for simplicity of illustration and discussion, and so as not to obscure the invention.

FIG. 1 is an example hardware block diagram of an example embodiment of the present invention. In FIG. 1 a device controller 20 communicates to a bus 10. Strictly for purposes of illustration, device controller 20 is an InfiniBand virtual expansion bus (IVXB) and the bus 10 is a peripheral component interface extended (PCIX) bus. As would be appreciated by one of ordinary skill of the art and as will become apparent in the discussion of the present invention, any device may be device controller 20 and any bus may be bus 10 as long as the size and/or the position of the tag bits expected by the bus 10 vary from that expected by core 30.

Still referring to FIG. 1, core 30 represents control logic utilized by the device controller 20. This core 30 control logic may be any logic or circuitry required to control a peripheral connected thereto. Core 30 is connected to host 40 via link 90 and link 100. Link 100 is utilized to transmit a transaction identifier (TID) which may be, but not limited to, a 10 bit term as described in table 1 and in reference to FIG. 4. Core 30 receives information from host 40 via link 90. This information received from host 40 over link 90 would be the same, but not limited to, the 10 bit TID as discussed in reference to link 100. In turn host 40 communicates to bus 10 via links 70 and 80. However, the information transmitted over links 70 and 80 would include a TAG which may be, but not limited to, a five bit term as further discussed in reference to table 2 and FIG. 4 ahead. The host 40 is able to accomplish this conversion utilizing the convert and store logic unit 60 and lookup logic unit 50. The convert and store logic unit 60 is discussed in further detail in reference to FIGS. 2 and 4. However, the basic function of the convert and store logic unit 60 is to convert the TID received from core 30 over link 100 into a TAG that is transmitted to bus 10 over link 80. In addition, the convert and store logic unit 60 will store both the TID and TAG for later lookup by the lookup logic unit 50. Upon transmission of the TAG by bus 10 over link 70 to the lookup logic unit 50 the associated TID is retrieved and transmitted to core 30 over link 90.

FIGS. 2 through 4 are flowcharts representing software, commands, firmware, hardware, instructions, computer programs, subroutines, code and code segments. The elements and operations of FIGS. 2 through 4 may take any form of logic executable by a processor, including, but not limited to, programming languages, such as C++.

FIG. 2 is a flowchart of a transmission module used to transmit information to bus 10 from a device controller 20 in an example embodiment of the present invention. The transmission module begins execution in operation 200 and immediately proceeds to operation 210. In operation 210, it is determined by the device controller 20 whether a particular operation requires interfacing to bus 10. In operation 220, an N bit TID is generated by the core 30 of the device controller 20. This TID would specify such information as, but not limited to, memory address and the operation to be performed. This information would be stored in the TID in some finite number of bits represented by N. Thereafter, in operation 230, the TID is transmitted to host 40 and then to the convert store logic unit 60. In operation 240, the convert store logic unit 60 converts the N bit TID to a N minus M bit TAG. M represents some finite number of bits which are fewer in number than N bits. In operation 250, the TID and associated TAG are both stored in a table contained within the host 40 unit. Thereafter, in operation 260 the TAG is transmitted over link 80 to bus 10. In operation 270, processing of the transmission module terminates.

FIG. 3 is a flowchart of a reception module used to receive information from a bus 10 by a device controller 20 in an example embodiment of the present invention. The reception module begins execution in operation 300 and immediately proceeds to operation 310. In operation 310, lookup logic unit 50 in host 40 receives a TAG from bus 10. In operation 320 the lookup logic unit 50 in host 40 searches a table to find the associated TID for the TAG received. Thereafter, in operation 330, the TID discovered in the table is transmitted to core 30 of device controller 20. Then in operation 340 processing for the reception module terminates.

An example embodiment for a TI D is illustrated ahead in table 1. Table 1 is provided strictly for illustrative purposes as an example of a 10 bit TID and how it may be used. In this TID example, the TID contains a total of ten bits as well as a read or write direction flag for the specific function. A total of four functions are described in table 1. A direct memory access (DMA) function is provided in which bit nine is set to one to indicate a DMA operation, bit 8 is set to indicate which work register or payload to use bit one is set to indicate which send or receive queue to use, while bit 0 indicates which task is accessed.

Still referring to table 1, an address translation block (ATB) function is provided in which bit 9 of the TID is set to 0 to indicate other then a DMA function is being performed. Further, bits 2 through 0 of the TID are used to indicate the register number that is being used, and the direction is set to zero to indicate a read operation is being performed.

Still referring to table 1, a completion queue engine (CQE) function is provided in which no DMA function is being performed so bit 9 of the TID is set to zero. Further, bit seven of the TID is also set to zero to indicate that a CQE function is being performed. In addition the direction flag is set to one to indicate that a write operation is being performed.

Still referring to table 1, programmable interrupt device (PID) function is provided in which again bit nine of the TID is set to zero. Bit seven of the TID set to one to indicate a PID function is being executed. Finally the direction flag set to one to indicate a write operation is being performed.

TABLE 1

TID Encoding

| | DMA | ATB | CQE | PID |
|---|---|---|---|---|
| TID(9) | DMA/Other (1) | DMA/Other (0) | DMA/Other (0) | DMA/Other (0) |
| TID(8) | Work Req/ Payload | Not Used for TAG | Not Used for TAG | Not Used for TAG |
| TID(7) | Not Used for TAG | Not Used for TAG | PID/CQE (0) | PID/CQE (1) |
| TID(6) TID(5) TID(4) TID(3) | TAG | TAG | Not Used for TAG | Not Used for TAG |
| TID(2) TID(1) TID(0) | SQ/RQ Task | Register Number | | |
| Direction | Write/Read | Write/Read (0) | Write/Read (1) | Write/Read (1) |

An example embodiment for a TAG is illustrated ahead in table 2. Table 2 is provided strictly for illustrative purposes as an example of a 5 bit TAG and how it may be used. In this TAG example, the TAG contains a total of 5 bits which are generated based on the information from the TID illustrated in table 1. The information needed to generate the TAG has been previously discussed in reference to the TID in table 1. However, in the discussion of table 1 only those bits relevant to the generation of the TAG were discussed. Additional bits required for the TID were not discussed or illustrated but are required by the core 30.

Table 2 illustrates the same functions as the illustrated in table 1 including DMA, ATB, CQE, and PID. In addition, the data previously discussed in table 1 required for the TAG is illustrated in the appropriate bit positions required by bus 10. For example, for a DMA function, TAG bit 4 is not set since direction is not relevant, TAG bit 3 is set to zero since this is a DMA function, and TAG bits 2, 1, and 0 zero contain same information as TID bits 8, 1, and 0, respectively. The same type of correspondence holds true for the ATB, CQE, and PID functions. Therefore, no further comment will be made regarding these functions.

TABLE 2

TAG Encoding

| | DMA | ATB | CQE | PID |
|---|---|---|---|---|
| TAG(4) | Direction | Direction (0) | Direction (1) | Direction (1) |

TABLE 2-continued

TAG Encoding

|        | DMA              | ATB                       | CQE          | PID          |
|--------|------------------|---------------------------|--------------|--------------|
| TAG(3) | Not DMA (0)      | Not DMA (1)               | Not DMA (1)  | Not DMA (1)  |
| TAG(2) | Work Req/Payload | Register Number bit 2     | PID/CQE (0)  | PID/CQE (1)  |
| TAG(1) | SQ/RQ            | Register Number Bit 1     | Reserved (0) | Reserved (0) |
| TAG(0) | Task             | Register Number Bit 0     | Reserved (0) | Reserved (0) |

FIG. 4 is a flowchart of the logic executed by an alternate example embodiment of the present invention in which the bus 10 is a peripheral component interface extended (PCIX) bus and the peripheral controller 20 is an InfiniBand virtual expansion bus (IVXB). Further, FIG. 4 is an alternate embodiment of FIG. 2 representing the transmission module with the exception that the transmission module in FIG. 4 is specifically designed to convert the TID shown in table 1 to the TAG shown in table 2. In addition, the transmission module shown in FIG. 4 executes within host 40, shown FIG. 1.

Still referring to FIG. 4, the transmission module begins execution in operation 400 and immediately proceeds to operation 410. In operation 410 it is determined whether bit 9 of the TID is set for a DMA function. If it is determined in operation 410 that bit 9 is sent to a DMA operation, then processing proceeds to operation 420. In operation 420, the TAG is set to the direction and is concatenated (&) with the inverse of TID bit 9 concatenated with TID bit 8 and concatenated with TID bits 1 through 0. Thereafter, processing proceeds to operation 460 where processing terminates.

Still referring to FIG. 4, if in operation 410 it is determined that bit 9 of the TID is not set for a DMA operation then processing proceeds to operation 430. In operation 430 it is determined if the direction flag is set for a read operation. If the direction flag is determined, in operation 430, to be set for a read operation then processing proceeds to operation 440. In operation 440, the TAG is set to the direction flag concatenated with the inverse of TID bit 9 which is concatenated to TID bits 2 through 0. Thereafter, from operation 440 processing proceeds to operation 460 where processing terminates.

Still referring to FIG. 4, if in operation 430 it is determined the direction flag is not set for a read operation, then processing proceeds to operation 450 where the TAG is set to the direction flag concatenated with the inverse of bit nine of the TID concatenated with bit seven of the TID and two 0 bits. Thereafter, processing proceeds operation 460 were processing terminates.

The benefit resulting from the present invention is that a simple, reliable, fast device, method and computer program is provided for a device controller to communicate to an industry standard bus. Further, no modification is required to the core logic of the device controller even though a different format and bit length is required for the industry standard bus versus the core logic of the device controller.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

I claim:

1. A device to convert and transmit information to and from a device controller and a bus, comprising:
    a bus;
    a device controller connected to the bus, comprising:
        a core unit;
        a host unit connected to the core unit and connected to the bus,
        comprising:
            a convert and store logic unit to convert one or more pieces of TID information transmitted by the core into one or more pieces of TAG information transmitted to the bus and store the TAG and TID information in a record contained within a memory in the host unit, wherein the TID information has N bits and the TAG information has N-M bits of information, wherein N and M are integer values and N-M must be greater than zero.

2. The device recited in claim 1, wherein the host unit further comprises:
    a lookup logic unit to receive TAG information from the bus and search the memory for matching TAG information; and
    transmitting the TID information to the core when a match for the TAG information is discovered.

3. The device recited in claim 2, wherein N represents 10 bits of TID information and M represents 5 bits of TAG information.

4. The device recited in claim 3, wherein the information contained in the TID and the information contained in the TAG depends upon the function being performed by the device controller and a direction flag, wherein the direction flag may represent a read operation or a write operation.

5. The device recited in claim 4, wherein when the function being performed is a direct memory access function the TAG information is set based upon the direction flag concatenated with the inverse of bit 9 of the TID information concatenated with bit 8 of the TID information concatenated with bits 1 through 0 of the TID information.

6. The device recited in claim 4, wherein when the function being performed is not a direct memory access function and the direction flag represents a read operation the TAG information is set based upon the direction flag concatenated with the inverse of bit 9 of the TID information concatenated with bit 8 of the TID information concatenated with bits 2 through 0 of the TID information.

7. The device recited in claim 4, wherein when the function being performed is not a direct memory access function and the direction flag represents a write operation the TAG information is set based upon the direction flag concatenated with the inverse of bit 9 of the TID information concatenated with bit 7 and concatenated with two bits set to 0.

8. A method of converting and transmitting information to and from a device controller and a bus, comprising:
    generating a TID having N bits by a core unit of the device controller;
    converting the TID to a TAG having N minus M bits, wherein N minus M must be an integer with a value greater than zero;
    storing the TID and the TAG in a record in a memory;
    transmitting the TAG to the bus;
    receiving the TAG back from the bus;
    searching the memory for the TAG and TID record; and transmitting the TID to the core unit of the device controller.

9. The method recited in claim 8, wherein N represents 10 bits of TID information and M represents 5 bits of TAG information.

10. The method recited in claim 9, wherein the information contained in the TID and the information contained in the TAG depends upon the function being performed by the device controller and a direction flag, wherein the direction flag may represent a read operation or a write operation.

11. The method recited in claim 10, wherein when the function being performed is a direct memory access function the TAG information is set based upon the direction flag concatenated with the inverse of bit 9 of the TID information concatenated with bit 8 of the TID information concatenated with bits 1 through 0 of the TID information.

12. The method recited in claim 10, wherein when the function being performed is not a direct memory access function and the direction flag represents a read operation the TAG information is set based upon the direction flag concatenated with the inverse of bit 9 of the TID information concatenated with bit 8 of the TID information concatenated with bits 2 through 0 of the TID information.

13. The method recited in claim 10, wherein when the function being performed is not a direct memory access function and the direction flag represents a write operation the TAG information is set based upon the direction flag concatenated with the inverse of bit 9 of the TID information concatenated with bit 7 and concatenated with two bits set to 0.

14. A computer program embodied on a computer readable medium executable by a computer for converting and transmitting information to and from a device controller and a bus, comprising:

generating a TID having N bits by a core unit of the device controller;

converting the TID to a TAG having N minus M bits, wherein N minus M must be an integer with a value greater than zero;

storing the TID and the TAG in a record in a memory;

transmitting the TAG to the bus;

receiving the TAG back from the bus;

searching the memory for the TAG and TID record; and transmitting the TID to the core unit of the device controller.

15. The computer program recited in claim 14, wherein N represents 10 bits of TID information and M represents 5 bits of TAG information.

16. The computer program recited in claim 15, wherein the information contained in the TID and the information contained in the TAG depends upon the function being performed by the device controller and a direction flag, wherein the direction flag may represent a read operation or a write operation.

17. The computer program recited in claim 16, wherein when the function being performed is a direct memory access function the TAG information is set based upon the direction flag concatenated with the inverse of bit 9 of the TID information concatenated with bit 8 of the TID information concatenated with bits 1 through 0 of the TID information.

18. The computer program recited in claim 16, wherein when the function being performed is not a direct memory access function and the direction flag represents a read operation the TAG information is set based upon the direction flag concatenated with the inverse of bit 9 of the TID information concatenated with bit 8 of the TID information concatenated with bits 2 through 0 of the TID information.

19. The computer program recited in claim 16, wherein when the function being performed is not a direct memory access function and the direction flag represents a write operation the TAG information is set based upon the direction flag concatenated with the inverse of bit 9 of the TID information concatenated with bit 7 and concatenated with two bits set to 0.

* * * * *